United States Patent
Kass et al.

(10) Patent No.: US 11,727,417 B2
(45) Date of Patent: Aug. 15, 2023

(54) STAKEHOLDER AND IMPACT DISCOVERY

(71) Applicant: Accenture Global Solutions Limited, Dublin (IE)

(72) Inventors: Alex M. Kass, Palo Alto, CA (US); Michael J. Biltz, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/008,040

(22) Filed: Aug. 31, 2020

(65) Prior Publication Data

US 2021/0326909 A1    Oct. 21, 2021

Related U.S. Application Data

(60) Provisional application No. 63/011,655, filed on Apr. 17, 2020.

(51) Int. Cl.
  *G06Q 30/0201*  (2023.01)
  *G06Q 50/00*    (2012.01)
  *G06Q 10/0637*  (2023.01)
  *G06F 40/30*    (2020.01)

(52) U.S. Cl.
  CPC ........ *G06Q 30/0201* (2013.01); *G06F 40/30* (2020.01); *G06Q 10/0637* (2013.01); *G06Q 50/01* (2013.01)

(58) Field of Classification Search
  CPC .......... G06Q 30/0201; G06Q 10/0637; G06Q 50/01; G06F 40/30
  USPC ..................................... 705/7.29
  See application file for complete search history.

(56) References Cited

U.S. PATENT DOCUMENTS

| | | | | |
|---|---|---|---|---|
| 2009/0178139 A1* | 7/2009 | Stute | ............. | H04L 63/1433 |
| | | | | 726/22 |
| 2009/0281863 A1* | 11/2009 | Yaskin | ............. | G06Q 30/0201 |
| | | | | 705/7.29 |
| 2011/0196719 A1* | 8/2011 | Bhandari | ......... | G06Q 10/06393 |
| | | | | 715/764 |
| 2015/0234944 A1* | 8/2015 | Marceau | ............. | G06F 30/23 |
| | | | | 703/1 |
| 2017/0236081 A1* | 8/2017 | Grady Smith | ..... | G06Q 10/0637 |
| | | | | 705/7.36 |

(Continued)

FOREIGN PATENT DOCUMENTS

| WO | WO-2014087427 A1 * | 6/2014 | ............. G06F 30/20 |
|---|---|---|---|
| WO | WO-2019183973 A1 * | 10/2019 | |

OTHER PUBLICATIONS

Lehmhus, Dirk "Cloud-Based Automated Design and Additive Manufacturing: A Usage Data-Enabled Paradigm Shift" Sensors (Basel, Switzerland), 15(12), 32079-32122 (2015) (Year: 2015).*

(Continued)

*Primary Examiner* — Abdallah A El-Hage Hassan
(74) *Attorney, Agent, or Firm* — Fish & Richardson P.C.

(57) ABSTRACT

This specification relates to methods, and systems for stakeholder and impact discovery. One of the methods includes receiving a knowledge representation model indicating at least a first stakeholder and a first impact; determining an impact model based at least in part on the knowledge representation model; receiving distributed sensor data; and determining at least a second impact based at least in part on the impact model and the distributed sensor data.

15 Claims, 5 Drawing Sheets

(56) References Cited

U.S. PATENT DOCUMENTS

2017/0316450 A1* 11/2017 Kobylkin .................. G06N 5/04
2019/0057166 A1*  2/2019 Liongosari ............ B60R 16/037
2020/0075160 A1*  3/2020 Agarwal ................. G06F 9/451

OTHER PUBLICATIONS

Mehdi Mohammadi "Deep Learning for IoT Big Data and Streaming Analytics: A Survey" IEEE Communications Surveys & Tutorials (vol. 20, Issue: 4, pp. 2923-2960) (2018) (Year: 2018).*

* cited by examiner

STAKEHOLDER AND IMPACT DISCOVERY

CROSS-REFERENCE TO RELATED APPLICATIONS

This application claims the benefit under 35 U.S.C. § 119(e) of the filing date of U.S. Patent Application No. 63/011,655, for "Stakeholder and Impact Discovery" which was filed on Apr. 17, 2020, and which is incorporated here by reference in its entirety.

BACKGROUND

Technical Field

This specification relates to stakeholder and impact discovery, e.g., the discovery of stakeholders for, and impacts resulting from, a design change of a product or service.

Background

Technologies continue to be developed to gather and analyze more data and a greater diversity of data. Embedded sensors, system traces, transaction traces, and other technology-enabled phenomena, including social media and online document repositories can generate data. Indeed, smart products and smart environments can produce rich streams of data that can be used to track events and behaviors.

SUMMARY

This specification describes technologies for stakeholder and impact discovery. These technologies generally involve using data obtained from a variety of sources such as smart environments to discover stakeholders and impacts (e.g., hidden, indirect stakeholders and/or impacts) of one or more products or programs (e.g., of one or more product or program design decisions). The technologies can inform design decisions, providing designers with a more comprehensive understanding of the full set of costs and benefits—to all stakeholders—of each design decision. These technologies also allow regulatory and other authorities to incentivize design decisions that optimize for a comprehensive set of impacts.

Systems and methods described in this specification aid the discovery of a variety of stakeholders such as potential new customers, those indirectly benefiting or harmed by a product design and those involved in getting a product to the market. An element of one implementation of such an impact discovery system is technology to build a stakeholder and impact web that models the relationships between a product, people that are impacted by the product, spaces in which the product operates and/or objects that mediate the impacts of the product. One can use semantic web technologies, such as the resource description framework (RDF) and web ontology language (OWL) to represent relevant relationships, including impacts of a design choice on stakeholders.

Once implementations of an impact discovery system have basic representation schemes/models, the system can then:
  Develop the models;
  Maintain the models;
  Merge models from different sources; and
  Discover relationships not known up front to modelers (both quantitative relationships and qualitative assessments) for example by receiving and processing data from distributed sensors.

In certain implementations, at least key aspects of the models can be represented in RDF knowledge graphs, and OWL run-time inference can be performed by OWL. The overall scheme for discovery can include a combination of semantic technologies to represent the basic models and draw logical inference, and statistical machine learning to extend the model by learning new patterns automatically over time. Maintenance and expansion of the models could be based on a human-machine collaboration, with human knowledge engineers building base models and vetting new model refinements suggested by data-driven machine learning.

In certain implementations, human knowledge engineers can use the technologies noted above to create a base model, defining entities and representing basic entity relationships using RDF. Knowledge engineers can also represent constraints in OWL-based ontologies embedded in the RDF. SPARQL (a query language for RDF) can be used to store and retrieve model elements to do inference.

As an example, a system described in this specification can examine stakeholders and impacts of a motorcycle design on noise pollution. Human knowledge engineers can use the system to build a basic model representing how much noise is generated by the motorcycle in question at various speeds and on various surfaces. The model can be based on initial test-track data. This test-track based model can be combined with another model that represents traffic patterns for motorcycles generally in a typical city. Then such a traffic pattern model can be mapped to a particular city of interest. These combined models can further incorporate data about residential densities to model how much impact there will be in terms of extra noise levels experienced across the population. These models, represented as knowledge graphs in RDF and OWL, provide a useful noise pollution model for a motorcycle design in question (leveraging general models created by a set of communities).

Notably, assumptions in the model may be challenged as additional data is accumulated from various forms of sensors and other data collection techniques once the newly designed motorcycle goes into service and is being used in various settings. For instance, it might turn out that the newly designed motorcycle is mostly used out on open roads, not in densely-populated areas, or that a particular city has traffic patterns that prevent it being used in the noisiest potential patterns, or that encourage it to be used in ways that create more noise impact. Data collected can be interpreted by artificial intelligence/machine learning (AI/ML) models, which then can update the models. Simple systems can update only for one type of motorcycle being instrumented at a time, but more sophisticated ML systems can generalize observations to classes of cities or classes of motorcycles or both. The updated models can be translated back into explainable semantic models which can be further refined either by human knowledge engineers or additional ML when more data is available.

In general, the ML systems will have the biggest role quantifying relationships, with human knowledge engineering being responsible for defining the qualitative relationships that need to be quantified.

Implementations of an impact discovery system described in this specification combine top-down stakeholder and impact hypothesis suggestion in the context of knowledge representation models with bottoms-up data-driven impact discovery (e.g. behavioral correlation). Once at least one impact is discovered, an implementation of the system can feed the impact into a design tool.

The initial knowledge representation modeling portion of an implementation of the impact discovery system can include a template suggestion engine. The template suggestion engine can start with a couple of hops (e.g., perhaps just one layer out from the consumer/customer to include for example the physically proximate co-workers of a consumer of a product such as a product used in a work environment). Once a template is identified and adopted for initial bottoms-up data collection, the system can use the template to help determine specified data collection regarding the impact of the product or product design choice has on the identified stakeholders. In addition, the system can use the identified template to help determine further impacted stakeholders and further impacts.

The modeling engine can model impacts for a particular situation using a taxonomy of impacts. The modeling engine can elicit potential impacts from a user, e.g., a product designer, based on categories such as health impacts (further broken down by physical impacts and psychological impacts) and environmental impacts.

A user such as product designer can identify one of more types of impacts from such a list of impact categories. Then, the impact discovery system can determine an impact discovery/verification based on knowledge representation template selected by the modeler/system interaction.

As an example, if a health impact template is chosen, the system may pose a series of questions to the modeler such as: is the health impact increasing/decreasing?; is there a risk of infection, if so what is the incubation period?; is there a risk of injury?; is there a risk of long term cardiovascular impacts?; and are the health impacts life threatening? In addition, the modeling engine can solicit from the modeler how detailed of an impact model to develop, e.g., how many impacts and/or stakeholders to consider.

In general, one innovative aspect of the subject matter described in this specification can be embodied in methods that include the actions of: receiving a knowledge representation model indicating at least a first stakeholder and a first impact; determining an impact model based at least in part on the knowledge representation model; receiving distributed sensor data; and determining at least a second impact based at least in part on the impact model and the distributed sensor data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Receiving a knowledge representation model can include: receiving data indicating at least the first stakeholder, at least the first impact and a context; and determining a knowledge representation model template based at least in part on the first stakeholder, the first impact and the context. Determining at least a second impact can include determining a crowd-sourced signal.

Determining the crowd-sourced signal can include applying natural language processing to social media data to determine a potential impact of a product. Determining at least a second impact can include obtaining data from distributed data sensors. Obtaining data from distributed data sensors can include determining which data to obtain based at least in part on a cost analysis of data collection. Obtaining data from distributed data sensors can include managing the privacy of the data obtained from distributed data sensors. Determining at least a second impact can include applying behavioral correlation to data obtained from distributed data sensors. Obtaining data from distributed data sensors can include obtaining data from a self-reporting system.

One can implement the subject matter described in this specification to realize one or more of the following advantages. Implementations of a stakeholder and impact discovery system described in this specification combine top-down knowledge representation modeling with bottoms-up impact discovery to allow users such as product designers to discover previously unknown impacts and/or to explore suspected impacts of products and product design decisions. Such an impact discovery system can provide data to product design tools to improve product design and to more fully incorporate (and potentially mitigate) product impacts in the design process. Such a system can allow a product designer to discover impacts at the time of design and to improve a product prior to scaling up the manufacture of the product. For example, a product designer can produce a relatively small amount of product, obtain data measuring the impacts of the product in a real-world environment and make adjustments to the product prior to producing a relatively large amount of the product. Similarly, the impact discovery system can obtain and analyze real-world data from distributed sensors and/or self-reporting sensor systems to discover and quantify impacts and provide the impact information to a product designer who can incorporate the impact information in the next version of the product. Such an impact discovery system usable at the time of design has not previously been available for a variety of reasons including that there has not been a sufficient numerosity and variety of sensors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for stakeholder and impact discovery. These technologies generally involve using data obtained from a variety of sources such as smart environments to discover stakeholders and impacts (e.g., non-obvious and/or hidden, indirect stakeholders and/or impacts) of one or more products or programs or of one or more product or program design decisions.

Implementations of an impact discovery system described in this specification combine top-down stakeholder and impact hypothesis suggestion in the context of knowledge representation models with bottoms-up data-driven impact discovery (e.g. behavioral correlation). Once at least one impact is discovered, an implementation of the system can feed the impact into a design tool to suggest alternative designs or at least to allow the designer to consider the impact when making design choices.

Figure 1A:
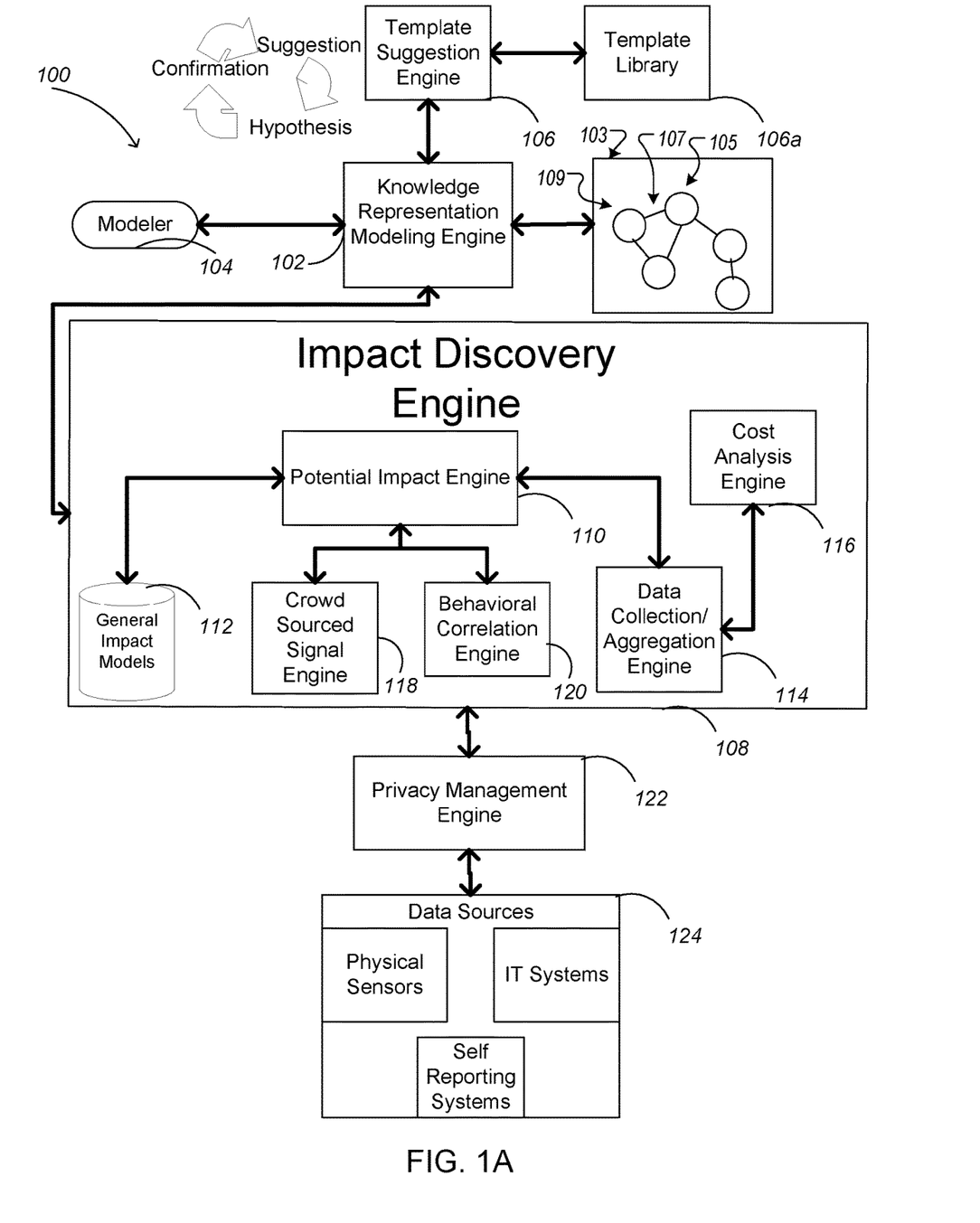
FIG. 1A is a block diagram illustrating one example of an impact discovery system.

FIG. 1A shows an example impact discovery system 100. An implementation of an impact discovery system can include a knowledge representation modeling engine 102 and an impact discovery engine 108. The impact discovery engine 108 can receive at least one knowledge representation model from the modeling engine 102 and data from data sources 124.

The modeling engine 102 can interact with a modeler 104 to initially model high-level known stakeholders and relationships. The modeling engine 102 can interact with a template suggestion engine 106 that can access a template library 106a containing a collection of templates of knowledge models that represent relationships between stakeholders. The template suggestion engine can utilize a suggestion/hypothesis/confirmation cycle to refine its template suggestion function.

The modeling engine 102 can feed the knowledge representation model into an impact discovery engine 108. The impact discovery engine 108 can include a potential impact engine 110 that can access a database of general impact models 112 and a data collection/aggregation engine 114. The general impact models database 112 can include impact models for a variety of contexts and the potential impact engine can select a general impact model to use based at least in part on a context provided by the received knowledge representation model.

The data collection/aggregation engine 114 can receive data from various data sources 124, e.g., via a privacy management engine 122 that can anonymize the data in an effort to ensure individual privacy. The data sources can include data sources that provide data on individuals affected by a product or service. The data sources can be individual physical sensors, information technology systems, and/or self-reporting sensor systems. The potential impact engine can provide instructions to the data collection engine 114 regarding which data to attempt to collect. The data collection engine 114 can access a cost analysis engine 116 to assist in determining what type and/or quantity of data to collect to help the potential impact engine determine impact of a product or service, e.g., of a design choice for a product or service.

The potential impact engine can further include a crowd-sourced signal engine 118. The crowd-sourced signal engine 118 can analyze data provided by the data sources to determine a crowd-source signal, e.g., an impact that is not provided by the knowledge representation model or the general impact model.

The potential impact engine can further include a behavioral correlation engine 120. Correlation is a statistical measure that indicates the extent to which two or more variables fluctuate together. Thus, behavioral correlation is a statistical measure that indicates the extent to which two or more behavior related variables fluctuate together. The behavior correlation engine 120 can analyze data provided by the data sources to determine potential behavioral correlations based on behaviors of individuals impacted by a product or service being studied.

With reference to FIG. 1A, in operation knowledge engineers create a baseline impact model, represented in a form that can be understood by both human designers and related AI system(s) described below. These impact models are used by designers, through integration in design tools, such as CAD/CAM tools and requirement/feature modeling tools, to estimate the cost-benefit to all the initially modeled stakeholders of various design choices. Product company(ies) and/or regulatory authority(ies) can create sensor/measurement infrastructure needed to measure a broad class of impacts. Note that this infrastructure can measure a set of impacts across many products. For example, sensors that measure road damage are relevant to a variety of vehicles and sound pollution sensors are relevant to a variety of vehicles.

Sensor networks can measure actual impacts detected, and then AI/ML systems can combine various sensors to attribute/allocate impacts across all contributing products. Doing this precisely can be difficult, but with enough of the right kinds of sensor data, and appropriate models, actionable approximations are possible over time as more data accumulates to enable finer-grained discrimination and more sophisticated analysis of the conditions under which a specified product contributes to specified impact, as well quantifying how much it does so.

Models can be constantly updated, to reflect two things: a) improved accuracy of modeling due to smarter analysis or more data; and b) changes to the landscape that change the impact. For instance, complementary products may increase or reduce impact or changes in behaviors may increase or reduce impact.

The impact discovery engine can then provide the discovered impact information (which can include cost-benefit information) to one or more design tools. Armed with this feedback, designers can see new cost-benefit information in their design tools, and can then choose to change design decisions to optimize overall impact.

Figure 1B:
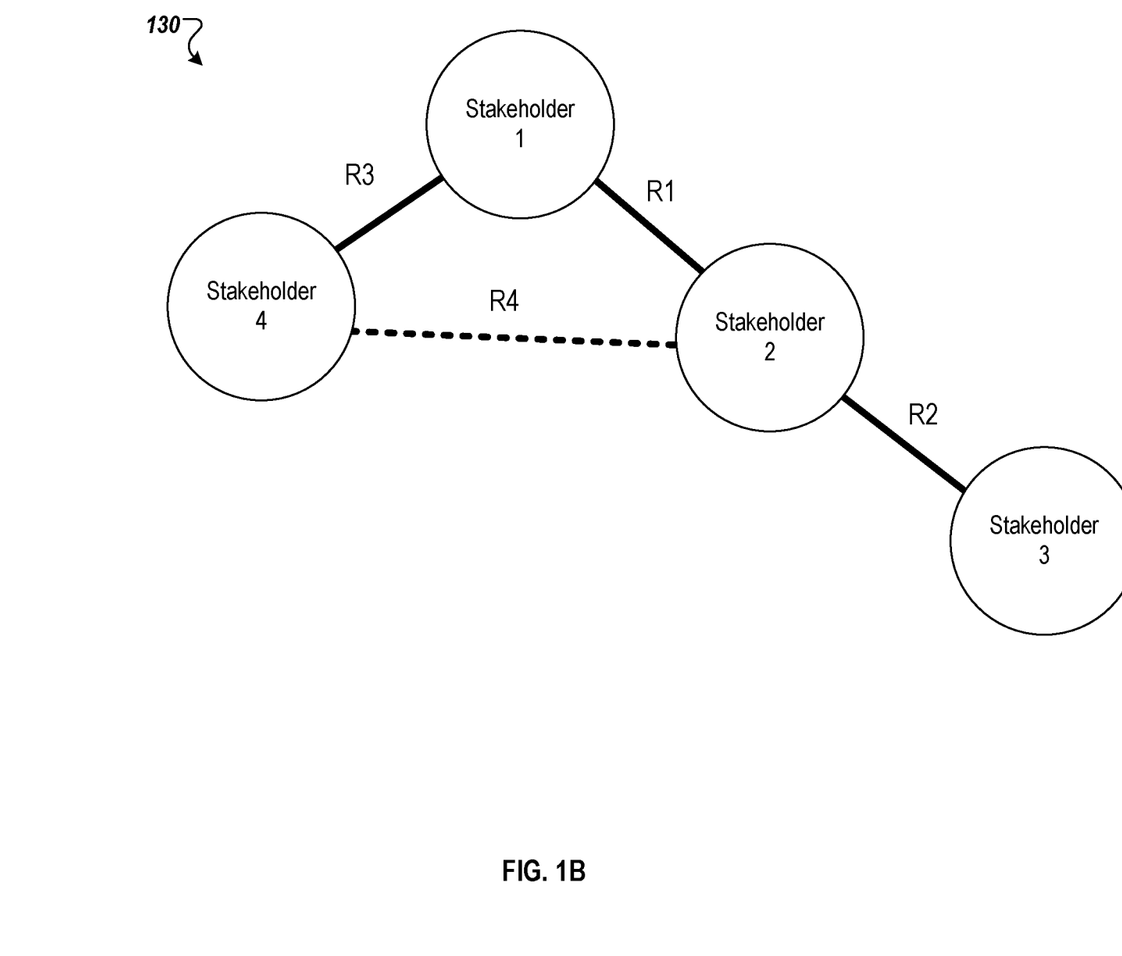
FIG. 1B depicts an example impact stakeholder graph for stakeholders of an impact network.

FIG. 1B depicts an example stakeholder impact graph 130 for stakeholders of an impact network. In this example, the stakeholder impact graph 130 includes four nodes for four stakeholders 1-4. However, stakeholder impact graphs can include other numbers of stakeholders. Stakeholder 1 can be an entity that produces a product or service that impacts the other stakeholders either directly or indirectly or it can be a user of a product or service. An edge between two stakeholders represents a direct impact between the two stakeholders. A stakeholder connected to another stakeholder through one or more other stakeholders represents an indirect impact between the stakeholder and the other stakeholder.

In this example, the product or service of stakeholder 1 impacts stakeholders 2 and 4 directly, and stakeholder 3 indirectly. The stakeholder impact graph 130 includes a relationship (Ri) between each pair of connected nodes. In addition, the product or service of stakeholder 1 impacts stakeholder 2 indirectly via stakeholder 4 and impacts stakeholder 4 indirectly via stakeholder 2. For example, if stakeholder 1 adds restaurant meal delivery to its other shipping and delivery services and stakeholders 2 and 4 are neighboring restaurants, this may add traffic to stakeholder 4 if stakeholder 2 participates in the meal delivery and may add traffic to stakeholder 4 is stakeholder 2 participates in the meal delivery. The delivery and shipping services of stakeholder 1 may also impact stakeholders 2 and 4 directly, e.g., if they use other shipping services of stakeholder 1 or are in the area in which stakeholder 1 delivers or ships products.

Figure 2:
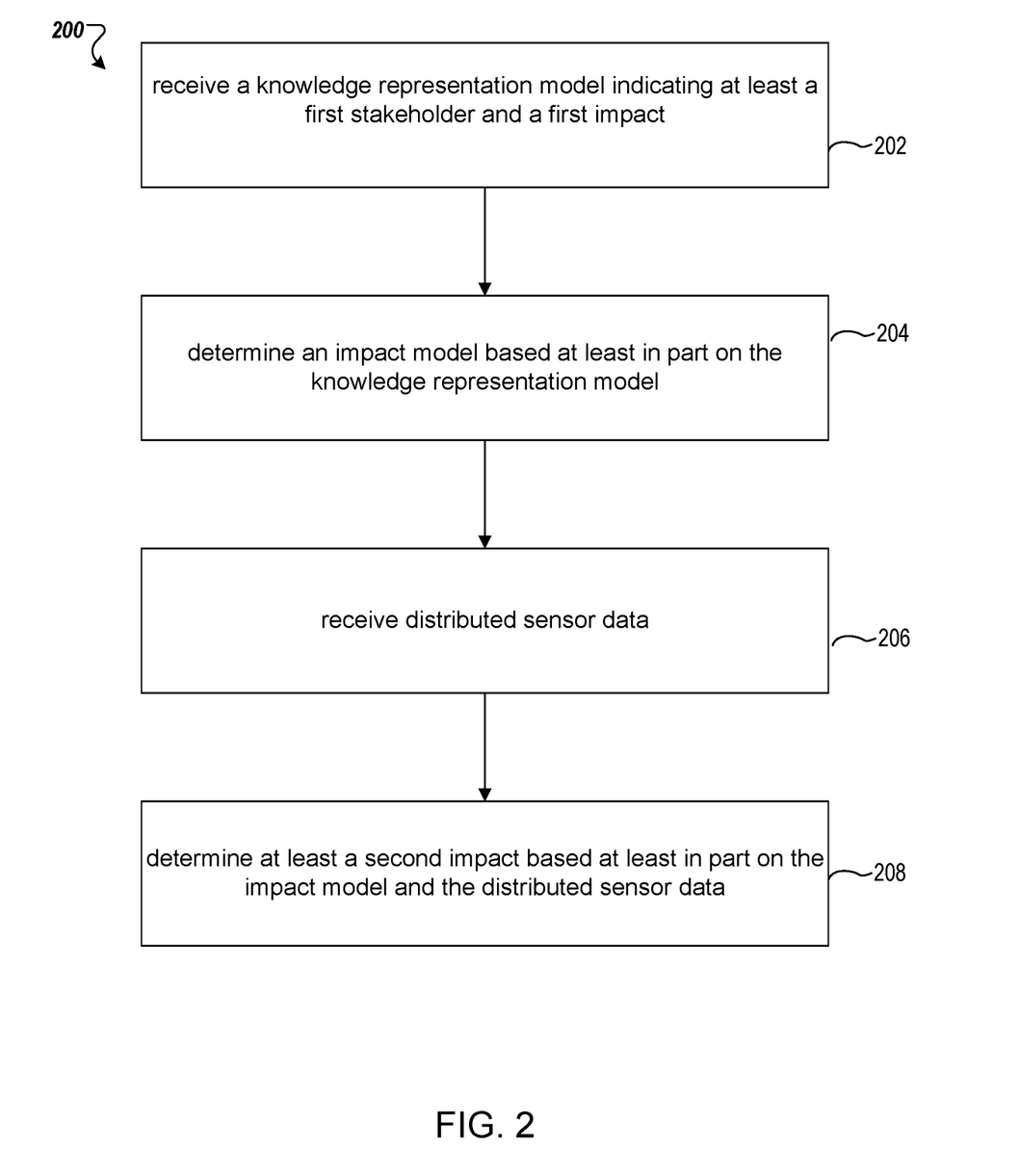
FIG. 2 is a flow chart illustrating one example of an impact discovery process.

FIG. 2 is a flowchart of an example process 200 for stakeholder and impact discovery. For convenience, the process 200 will be described as being performed by a system of one or more computers, located in one or more locations, and programmed appropriately in accordance with this specification. For example, an impact discovery system, e.g., the impact discovery system 100 of FIG. 1, appropriately programmed, can perform the process 200. The process 200 includes receiving 202 a knowledge representation model indicating at least a first stakeholder and a first impact; determining 204 an impact model based at least in part on the knowledge representation model; receiving 206 distributed sensor data; and determining at least a second impact based at least in part on the impact model and the distributed sensor data.

Figure 3:
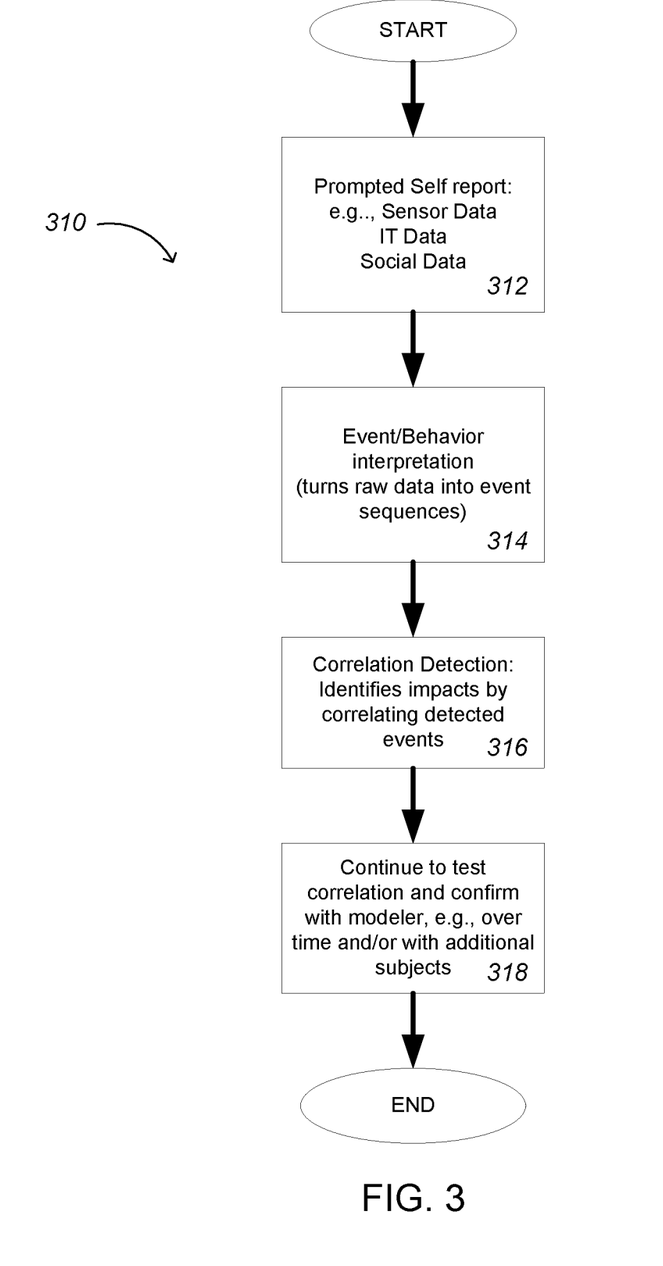
FIG. 3 is a flow chart illustrating another example of an impact discovery process.

FIG. 3 is a flow chart illustrating one example of a sensor-based impact discovery process 310, e.g., an impact discovery process based on a set of distributed sensors. Implementations can include sensors that are centrally controlled and/or autonomous (i.e., sensors that push data to a database with the need for receipt of instructions from a source external to the sensor). With reference to FIGS. 1A and 3, the process 310 begins with data (e.g., sensor data, information technology system data and/or social data) being received 312 at the impact discovery engine 108. At step 314, the impact discovery engine 108 interprets event/behavior data by turning raw data into event sequences that can reveal behavior. At step 316, the impact discovery engine 108 can detect correlations, e.g., it can identify potential impacts by correlating detected events. At step 318, the impact discovery engine 108 can continue to test a detected correlation over time and/or with additional subjects. The impact discovery engine 108 can also confirm a detected correlation with one or more modelers by asking the modeler(s) whether the correlation makes sense to the modeler(s).

An authority e.g., a government-derived cap and trade authority or a private ordering authority can provide a framework for valuation of impacts (and optionally a market for impacts). The authority can set a cap and/or allowance with regard to a specified impact. For example, a state-based noise pollution regulatory agency can use an open source model to measure noise pollution near a highway and to fine those who contribute to a decibel level above a specified threshold. Knowledge of such a regulatory framework can help to focus the impact discovery system on impacts and stakeholders of interest.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Figure 4:
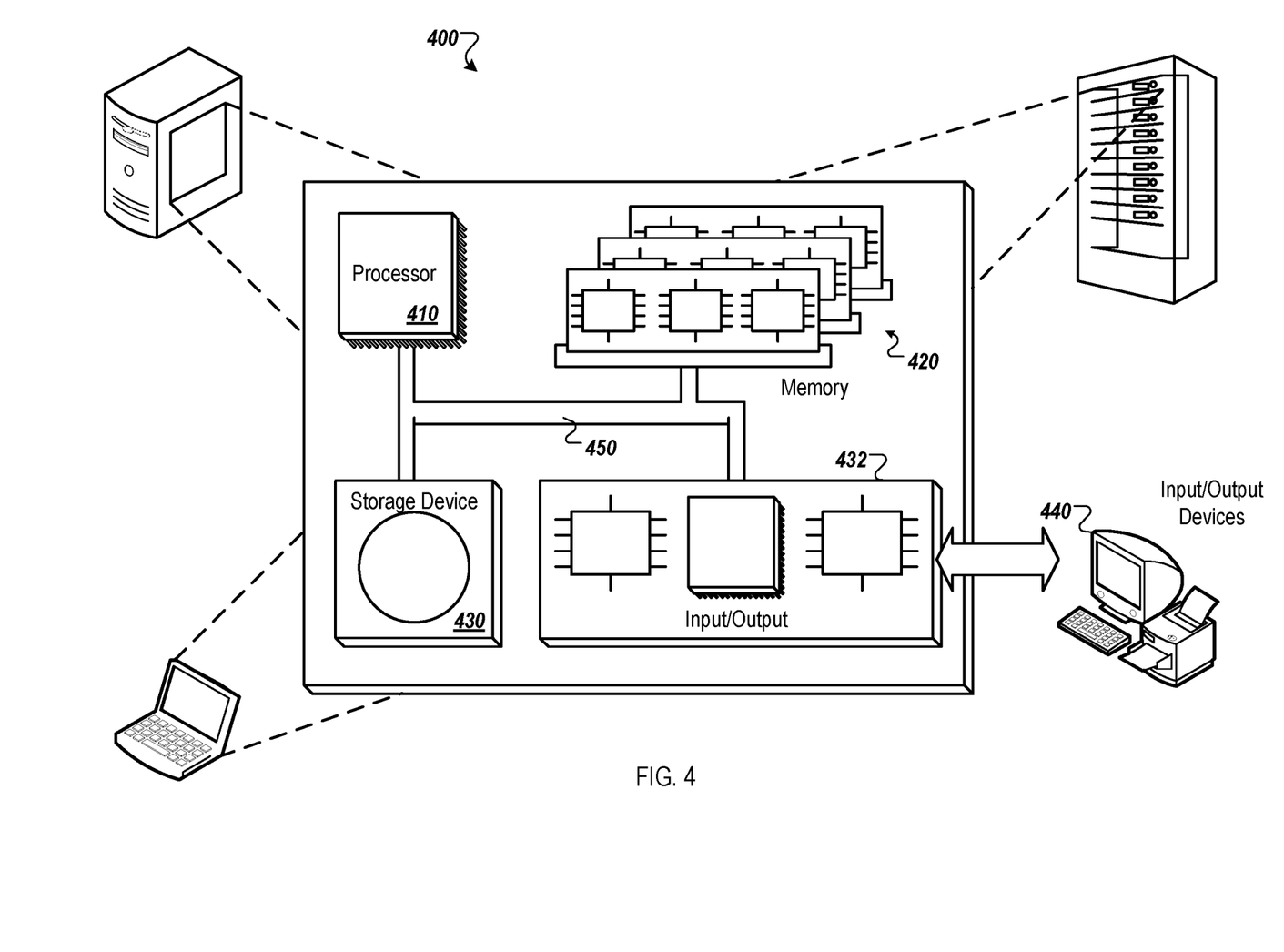
FIG. 4 is a block diagram of an example computer system.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output module 432 includes hardware or hardware and software for interfacing system 400 with the input/output device 440 or other devices or interfaces.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving an initial knowledge representation model indicating at least a first stakeholder and a first physical impact of a product having a first design on the first stakeholder, wherein receiving the initial knowledge representation model comprises:
receiving data indicating at least the first stakeholder, the first physical impact of the product on the first stakeholder and a context;
generating an impact model based at least in part on the initial knowledge representation model, wherein the impact model represents relationships between multiple stakeholders and physical impacts of design choices for the product on the multiple stakeholders;
receiving distributed sensor data from physical sensors that measure actual impacts of the product on objects in a physical environment, the receiving of the distributed sensor data comprising receiving impact data from sensor measurement infrastructure created by a regulatory authority and comprising receiving sensor data from centrally-controlled sensors and from self-reporting, autonomous sensors that push data to a database without a need for receipt of instructions from a source external to the autonomous sensors;
determining a second physical impact on each of one or more of the multiple stakeholders by the product based at least in part on the impact model and the distributed sensor data, wherein determining the second physical impact of the product on each of the one or more stakeholders comprises determining a crowd-sourced signal by applying natural language processing to social media data to determine a potential physical impact of the product;
refining, using a trained machine learning model, the impact model based at least on the distributed sensor data to generate a refined impact model, the refined impact model including an improved knowledge representation model and having improved accuracy of the modeled relationships between the multiple stakeholders and corresponding physical impacts of design choices for the product on the multiple stakeholders; and
generating alternative designs of the product using the refined impact model and based on the second physical impact on each of the one or more stakeholders.

2. The method of claim 1, wherein receiving the distributed sensor data from the physical sensors comprises determining which data to obtain based at least in part on a cost analysis of data collection.

3. The method of claim 1, wherein receiving the distributed sensor data from the physical sensors comprises managing privacy of the data obtained from distributed data sensors.

4. The method of claim 1, wherein determining the second physical impact on each of the one or more stakeholders comprises applying behavioral correlation to data obtained from distributed data sensors.

5. The method of claim 1, wherein receiving the distributed sensor data from the physical sensors comprises obtaining data from a self-reporting system.

6. The method of claim 1, further comprising translating the refined impact model into a semantic model.

7. The method of claim 6, further comprising further refining the semantic model using an additional machine learning model.

8. A system comprising:
one or more computers and one or more storage devices on which are stored instructions that are operable, when executed by the one or more computers, to cause the one or more computers to perform operations comprising:
receiving an initial knowledge representation model indicating at least a first stakeholder and a first physical impact of a product having a first design on the first stakeholder, wherein receiving the initial knowledge representation model comprises:
receiving data indicating at least the first stakeholder, the first physical impact of the product on the first stakeholder and a context;
generating an impact model based at least in part on the initial knowledge representation model, wherein the impact model represents relationships between multiple stakeholders and physical impacts of design choices for the product on the multiple stakeholders;
receiving distributed sensor data from physical sensors that measure actual impacts of the product on objects in a physical environment, the receiving of the distributed sensor data comprising receiving impact data from sensor measurement infrastructure created by a regulatory authority and comprising receiving sensor data from centrally-controlled sensors and from self-reporting, autonomous sensors that push data to a database without a need for receipt of instructions from a source external to the autonomous sensors;
determining a second physical impact on each of one or more of the multiple stakeholders by the product based at least in part on the impact model and the distributed sensor data, wherein determining the second physical impact of the product on each of the one or more stakeholders comprises determining a crowd-sourced signal by applying natural language processing to social media data to determine a potential physical impact of the product;
refining, using a trained machine learning model, the impact model based at least on the distributed sensor data to generate a refined impact model, the refined impact model including an improved knowledge representation model and having improved accuracy of the modeled relationships between the multiple stakeholders and corresponding physical impacts of design choices for the product on the multiple stakeholders; and
generating alternative designs of the product using the refined impact model and based on the second physical impact on each of the one or more stakeholders.

9. The system of claim 8, wherein receiving the distributed sensor data from the physical sensors comprises determining which data to obtain based at least in part on a cost analysis of data collection.

10. The system of claim 8, wherein receiving the distributed sensor data from the physical sensors comprises managing privacy of the data obtained from distributed data sensors.

11. The system of claim 8, wherein determining the second physical impact on each of the one or more stakeholders comprises applying behavioral correlation to data obtained from distributed data sensors.

12. The system of claim 8, wherein receiving the distributed sensor data from the physical sensors comprises obtaining data from a self-reporting system.

13. A method comprising:

determining an initial knowledge representation model indicating at least a first stakeholder, at least a first physical impact of a product having a first design on the first stakeholder and a context, wherein determining the initial knowledge representation model comprises determining a knowledge representation model template based at least in part on the first stakeholder, the first physical impact of the product on the first stakeholder and the context;

generating an impact model based at least in part on the initial knowledge representation model, wherein the impact model represents relationships including impacts of a design choice for at least the product on multiple stakeholders;

receiving distributed sensor data from physical sensors that measure actual impacts of the product on objects in a physical environment, the receiving of the distributed sensor data comprising receiving impact data from sensor measurement infrastructure created by a regulatory authority and comprising receiving sensor data from centrally-controlled sensors and from self-reporting, autonomous sensors that push data to a database without a need for receipt of instructions from a source external to the autonomous sensors;

determining a second physical impact on each of one or more of the multiple stakeholders by the product based at least in part on the impact model and the distributed sensor data, wherein determining the second physical impact of the product on each of the one or more stakeholders comprises determining a crowd-sourced signal by applying natural language processing to social media data to determine a potential physical impact of the product; and refining, using a trained machine learning model, the impact model based at least on the distributed sensor data to generate a refined impact model, the refined impact model including an improved knowledge representation model and having improved accuracy of the modeled relationships between the multiple stakeholders and corresponding physical impacts of design choices for the product on the multiple stakeholders.

14. The method of claim 13, further comprising adjusting the product based on the second physical impact on each of the one or more stakeholders to produce an adjusted product and producing the adjusted product.

15. The method of claim 13, further comprising integrating the impact model with a CAD/CAM tool to produce an integrated impact model and using the integrated impact model to estimate a cost-benefit of a design choice.

\* \* \* \* \*